United States Patent
Lima

(10) Patent No.: US 7,468,814 B2
(45) Date of Patent: Dec. 23, 2008

(54) ALGORITHM FOR CONTROLLING HALF TONING PROCESS

(75) Inventor: Anthony J. Lima, Bristol, RI (US)

(73) Assignee: Astro-Med, Inc., West Warwick, RI (US)

( * ) Notice: Subject to any disclaimer, the term of this patent is extended or adjusted under 35 U.S.C. 154(b) by 539 days.

(21) Appl. No.: 11/230,406

(22) Filed: Sep. 20, 2005

(65) Prior Publication Data
US 2006/0176517 A1    Aug. 10, 2006

Related U.S. Application Data

(60) Provisional application No. 60/651,022, filed on Feb. 8, 2005.

(51) Int. Cl.
*G06K 15/00* (2006.01)
(52) U.S. Cl. .............. 358/3.06; 358/3.01; 358/3.03; 358/3.05; 358/3.13; 358/3.17
(58) Field of Classification Search ........... 358/3.05, 358/3.06, 3.01, 3.03, 3.13, 3.17
See application file for complete search history.

(56) References Cited

U.S. PATENT DOCUMENTS

| | | | | |
|---|---|---|---|---|
| 5,150,429 | A * | 9/1992 | Miller et al. ............. | 382/275 |
| 5,309,526 | A | 5/1994 | Pappas et al. ............ | 382/56 |
| 5,313,287 | A | 5/1994 | Barton .................... | 382/25 |
| 5,444,551 | A | 8/1995 | Miller et al. ............. | 358/3.1 |
| 5,493,416 | A * | 2/1996 | Fan ....................... | 358/447 |
| 5,548,407 | A | 8/1996 | von Kienlin et al. ...... | 358/298 |
| 5,557,709 | A | 9/1996 | Shu ....................... | 395/109 |
| 5,592,592 | A | 1/1997 | Shu ....................... | 358/1.9 |
| 5,740,279 | A | 4/1998 | Wang et al. .............. | 382/237 |
| 5,768,425 | A | 6/1998 | Praveen et al. ........... | 382/232 |
| 5,818,971 | A * | 10/1998 | Moolenaar et al. ........ | 382/252 |
| 5,831,626 | A | 11/1998 | Sano et al. ............... | 345/431 |

(Continued)

FOREIGN PATENT DOCUMENTS

EP    418844 A2 *  3/1991
EP    880275 A2 *  11/1998

OTHER PUBLICATIONS

P. Li and J. P. Allebach, "Clustered-minority-pixel error diffusion", Jul. 2004, Journal Optical Society of America, vol. 21, No. 7, pp. 1148-1160.*

(Continued)

*Primary Examiner*—Mark K Zimmerman
*Assistant Examiner*—Miya J Cato
(74) *Attorney, Agent, or Firm*—Barlow Josephs & Holmes

(57) ABSTRACT

An algorithm for modulating printer half-tone screening based on the tonal values of the region being reproduced is provided. The algorithm determines the tonal values for a particular region and assigns real number constants to that region. As the clustering screen is applied, the threshold values in the clustering screen are reduced (divided) by the real number constants thereby modulating the effect of the application of the clustering screen. For deep tonal regions, the clustering screen is applied at full strength, while in light tonal regions no clustering effect is applied. The algorithm results in a an image that has a greater dynamic range without the appearance of stair stepping while eliminating clustering artifacts from the lighter regions.

14 Claims, 4 Drawing Sheets

U.S. PATENT DOCUMENTS

| | | |
|---|---|---|
| 5,855,433 A | 1/1999 | Velho et al. .................. 382/162 |
| 5,901,275 A | 5/1999 | Broddin et al. ............. 395/109 |
| 5,917,994 A | 6/1999 | Perumal, Jr. et al. ........ 395/109 |
| 6,088,512 A | 7/2000 | Ancin et al. ................. 395/109 |
| 6,141,121 A | 10/2000 | Chen et al. .................. 358/534 |
| 6,266,079 B1 | 7/2001 | Gershony et al. ........... 347/251 |
| 6,266,157 B1 * | 7/2001 | Fan et al. ...................... 358/1.9 |
| 6,307,978 B1 * | 10/2001 | Metaxas ...................... 382/252 |
| 6,346,993 B1 | 2/2002 | Curry ......................... 358/1.9 |
| 6,496,603 B1 | 12/2002 | Chang ........................ 382/252 |
| 6,505,905 B1 | 1/2003 | Krouss ........................ 347/15 |
| 6,753,978 B1 | 6/2004 | Chang ....................... 358/3.04 |
| 6,763,144 B1 | 7/2004 | Gershony .................. 382/274 |
| 6,778,299 B2 | 8/2004 | Lin et al. .................... 358/3.03 |
| 6,791,718 B1 | 9/2004 | Allebach et al. ........... 358/3.13 |
| 6,801,337 B2 | 10/2004 | Bhaskar et al. .............. 358/1.9 |
| 6,813,044 B2 | 11/2004 | Rylander .................. 358/3.13 |
| 6,937,365 B2 * | 8/2005 | Gorian et al. ................. 358/1.9 |
| 7,345,792 B2 * | 3/2008 | Fan ............................ 358/3.15 |
| 2002/0089708 A1 | 7/2002 | Cheng et al. ................. 358/534 |
| 2003/0133160 A1 | 7/2003 | Sharma et al. ............. 358/3.06 |
| 2004/0017579 A1 | 1/2004 | Lin ............................. 358/1.9 |
| 2004/0051906 A1 | 3/2004 | Engbrocks et al. ......... 358/3.03 |
| 2004/0090654 A1 | 5/2004 | Minnebo et al. ........... 358/3.03 |
| 2004/0119994 A1 | 6/2004 | Minnebo et al. ............. 358/1.9 |
| 2006/0077489 A1 * | 4/2006 | Zhang et al. ................. 358/504 |

OTHER PUBLICATIONS

Knox, "Printing with Error Diffusion", Recent Progress in Digital Halftoning, Xerox Corp., Webster, NY, pp. 1-5, 1994.

Fan, "Halftoning by Combining Ordered Dithering and Error Diffusion", 1992 Recent Progress in Digital Halftoning, Xerox Corp., Webster, NY pp. 153-155.

Mitchell, et al, "Multilevel Color Halftoning"IBM Research Rept., RC22274 (W0112-018), Dec. 4, 2001, Computer Science.

Vaidyanathan, "Optimized halftoning using dot diffusion and methods for inversehalftoning", IEEE Xplore Release 2.1, Apr. 2000, vol. 9, Issue 4, pp. 691-709.

* cited by examiner

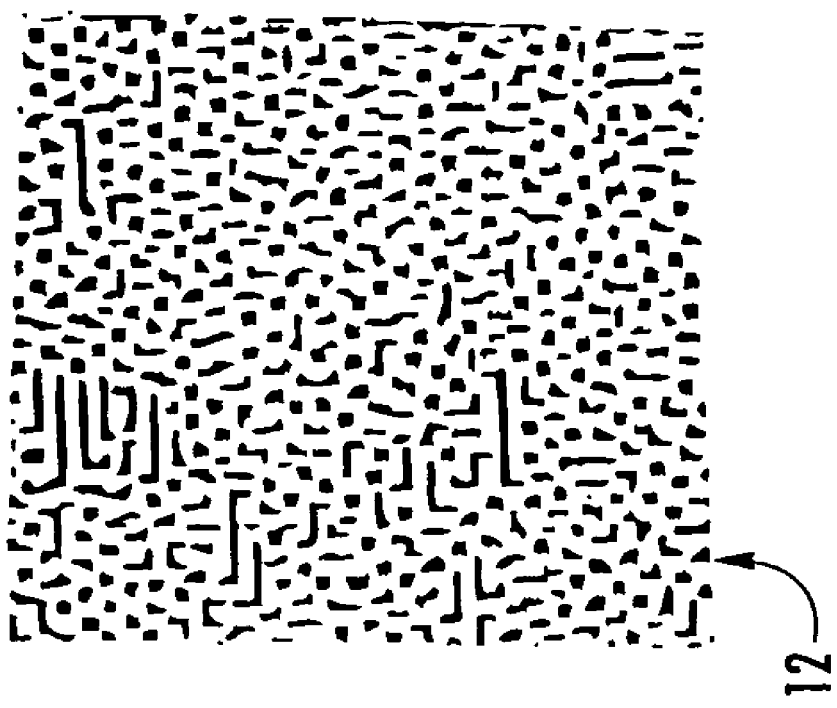
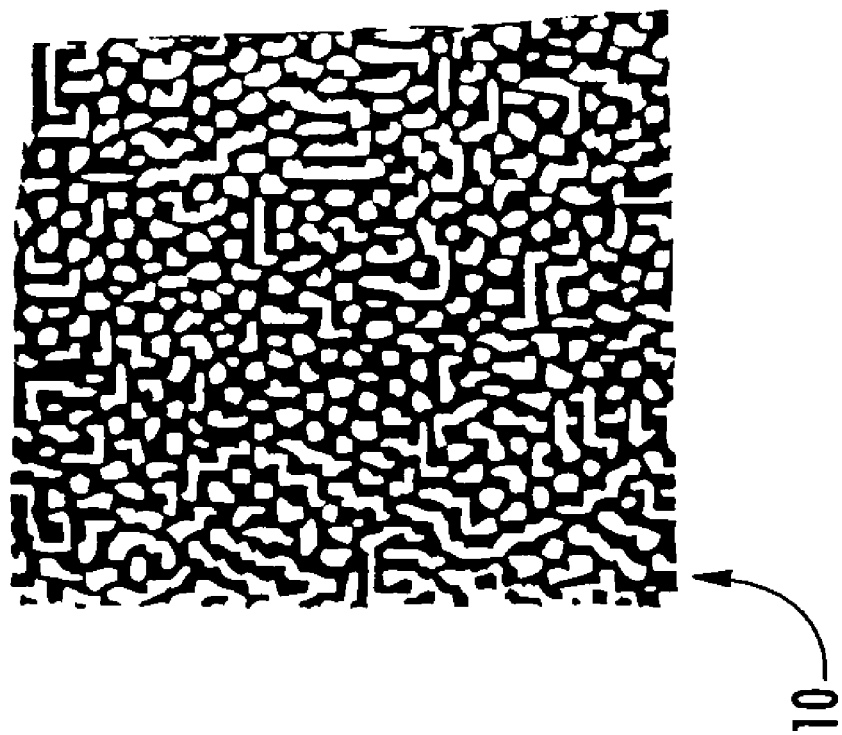
FIG. 2

ALGORITHM FOR CONTROLLING HALF TONING PROCESS

CROSS-REFERENCE TO RELATED APPLICATIONS

This application is related to and claims priority from earlier filed U.S. Provisional Patent Application No. 60/651,022, filed Feb. 8, 2005.

BACKGROUND OF THE INVENTION

The present invention relates generally to a new algorithm for controlling a half-toning process when generating output in preparation for printing. More specifically, the present invention relates an algorithm for modulating the strength of printer half-tone screening based on an initial assessment of the tonal value of the region being reproduced.

Generally in the prior art, printers create images using a combination of ink from a limited color palette by overlying the available colors in manner that creates the appearance of much broader range of colors. For example, most color printers have either three or four different colors available for printing wherein a three color printer includes three heads for printing cyan, yellow and magenta inks and a four color printer includes four heads for printing cyan, yellow, magenta and black. The printer then utilizes the available ink colors, in varying combinations to produce a broad range of composite colors.

In this context, it should be appreciated by one skilled in the art, that any particular ink supply, such as a transfer ribbon or ink tank, only has one ink available for use in a printing operation and is accordingly only capable of printing one shade of color no matter how much of the ink is transferred from the ink supply to the media. Therefore, in order to create various shades or intensities of any given color, the printer utilizes a form of visual deception known as half-toning. In the half-toning process, two approaches exist for varying the appearance of the dots in the printed output. In one approach, the printer controls the intensity of the color by controlling the actual size of each of the dots that are transferred. In this approach, as more ink is applied, a larger dot is produced and as less ink is applied, a smaller dot is generated.

In a second approach, the printer divides the image into an array of virtual dots, each of which is formed from an array of individual physical dots, each of which has a constant size. In this approach, the printer controls the size of the virtual dot by varying the number and pattern of physical dots printed within the virtual dot. As can be appreciated, in this particular method, the appearance of the virtual dot is fully reliant on the array of printed dots within the virtual dot and consistent dot size is critical to producing consistent print output. Any variation in the size of physical dot within the virtual dot would produce a slight variation in the overall density depicted by the virtual dot.

Accordingly, even though a color printer typically only has three colors, namely, cyan, yellow and magenta, any number of other colors can be created by overlying a half-tone print of each of the colors wherein controlling the size of the virtual dots controls the relative intensity level of each color. In turn, varying the ink transferred in order to change the physical size of the dot or adjusting the number and pattern of the dots printed within a virtual dot controls the size of the virtual dots.

In the prior art, two methods have been utilized for the conversion of images from a true color image to a printable halftone image. The first method is generally classified as ordered screening, where groups of physical dots are placed into a pattern or cluster to occupy a small region referred to as a virtual dot. In this method, the value of the colors over a certain region are assessed and then represented as a virtual dot having a size that represents the intensity of the original color in the grid square being screened. For illustration purposes, FIG. 1 depicts a simple example of the half-toning process using the ordered screening method. Printing an image of solid magenta onto the media is easy because the printer includes a magenta transfer ribbon. All the printer has to do is fill the image on the media with magenta ink. When printing a medium or light shade of magenta onto the media, the process becomes more complicated because the printer does not have a light magenta ribbon. To print a light magenta color, the printer must simulate it using the magenta ink supply. By controlling the size of the dots of magenta ink that are transferred, lighter colors are simulated. FIG. 1 depicts a printed image including a medium shade of magenta at reference 2 and a light shade of magenta at reference 6. In the medium shade print 2, rather than filling the page with magenta ink, the printer creates a virtual dot 4 that is comprised of an array of clustered physical dots 5 that represent a reduced density of magenta ink to simulate a lighter shade of magenta. In this manner, when the printer transfers virtual dots 4 that are reduced in size, (virtual or actual) some of the original background color of the media remains exposed. In this manner, the viewer's eye sees the mix of small magenta dots 4 and the background color and perceives the overall mix as a medium shade of magenta. To make an even lighter shade of magenta, as seen at reference 6, the virtual dots 8 simply must be smaller in size and/or fewer in number, as represented by the smaller cluster of physical dots 9, thereby allowing more of the background color to show through the magenta ink. This method produces a highly consistent representation and reduces the effects of aberrations, such as dot gain, giving the printer a broader dynamic range. The disadvantage of this method is that a limited number of fixed colors are available across a tonal range, resulting in a staircase effect when printing a gradient. Further, the clustering generally results in a lower effective output resolution because by clustering the dots within regions, the definition of small or detailed features tends to become blurred or lost.

The second method is a modified form of error diffusion, which represents each pixel by a physical printer dot of its own. While this method greatly improves resolution over clustering, the effect of dot gain (i.e. the impact of adjacent printed dots on one another) dramatically increases in darker tonal regions, saturating the media quickly and ultimately limiting the overall dynamic range of the printer. The benefits to this method however are seen in lighter tonal regions, wherein definition and detail are greatly maintained. Further, before the saturation point is reached, the range of reproducible colors is greater, resulting in the elimination of the stepping appearance seen in the screening algorithms. FIG. 2 illustrates a darker tonal region 10 and a lighter tonal region 12 printed with the error diffusion method. In this method, a decision is made whether or not to turn on a discrete physical dot based on a threshold value. The actual value of the tonal difference between a pixel and the threshold value used to determine the on or off state is then transferred forward to the next pixel being analyzed thereby increasing or decreasing the probability that that pixel would be turned on. This forward distribution of the error is "diffused" throughout the tonal field thereby creating a representation of the actual desired tonal value. It can be seen however that when utilizing this method, worming and random patterns can be seen to arise.

There is therefore a need for a half-toning algorithm that allows smooth representation of gradient tones while providing high definition light tonal values and greater dynamic range for the rendering of deep tonal values. There is a further need for a half-toning algorithm that operates in real time, thereby reducing the time required for calculating and producing the required printer commands.

BRIEF SUMMARY OF THE INVENTION

In this regard, the present invention provides a new algorithm for controlling the half-toning process when generating printed output. More specifically, the present invention provides an algorithm for modulating printer half-tone screening based on the tonal value of the region being reproduced. In accordance with the present invention, the strengths of the two prior art methods (ordered screening and error diffusion reproduction) have been recognized and a unique algorithm has been developed to capitalize on the strength of each of the preferred methods when reproducing tonal values that reside within their respective advantageous ranges. Specifically, the ordered clustering method works well for deeper tonal regions where color saturation and dynamic color range are desired and resolution is not as critical. Conversely, the error diffusion reproduction method works well in light tonal regions for producing smooth high-resolution images and superior gradient representations where dot gain and color saturation is not a concern.

The algorithm for controlling a printer of the present invention utilizes a screening algorithm that is modulated based on the tonal value of the region being reproduced to provide stronger clustering effects in deeper tonal regions and weaker clustering as the tonal values become lighter and ultimately allowing more of an error diffusion reproduction as the lightest tonal regions are printed. Specifically, the algorithm has a continuous range of steps to modulate the level of clustering effect that is utilized, where the least clustering is utilized for light tonal regions and maximum clustering is utilized for dark tonal areas.

In operation, as the image is processed utilizing the algorithm of the present invention, the tonal value of each pixel in a region to be screened is analyzed to generate a numeric real number constant between 1 and 6 that corresponds to the intensity of the tonal value of the pixel in the region. Then, as the screening matrix is applied for the clustering algorithm, the value in the position in the clustering screen that corresponds to the pixel being analyzed is divided by the constant that was determined from the pixel. Thereby reducing the threshold value within the screening matrix based on the relative intensity of the pixel. It can thus be appreciated that the strength with which the clustering screen is applied is modulated by the actual tonal value of the pixel being analyzed. In other words, depending on the result of the numeric constant of the particular pixel analyzed, the screening effect is modulated to control the relative level of clustering. At the darkest tonal level of 1.0, the threshold values within the screen are divided by 1. The result provides for the clustering threshold values to be unmodified by the constant and therefore a highly clustered effect is provided. Similarly, at the lightest tonal level of 6.0, the threshold values within the screen are reduced by a factor of six. The result in these lighter tonal regions is to provide a greatly reduced threshold value that nearly eliminates the clustering effect. As can be appreciated, by selecting a real number constant ranging between 1 and 6 based on the relative intensity of the tonal values a smooth transition is provided from a fully clustered effect to a fully error diffusion effect without the introduction of stepping or impact to the reproducible dynamic range. The resultant image has a highly effective resolution on lighter areas and an increased dynamic range in darker areas with virtually no staircase effect or artifacts developing in the transitional regions.

A further advantage of the present invention is that the algorithm is applied in real time as the image is being processed. The constants are determined as provided above and applied to each corresponding element of the clustering screen at the time the image is analyzed to modify the threshold values within the screen. The modulated screen is then utilized to reproduce the image for the half-tone output. There is no need for a database which stores look up tables and the like to determine which screen will be applied as was done in the prior art. In this manner, the strength of the screen is modulated in real time to cause a clustering effect within the error diffusion calculation as it is applied to deep tonal regions and to reduce or eliminate the clustering effect in light tonal regions. The process of the present invention, wherein the pixel being processed is evaluated to assign a tonal value to the pixel, a numeric value within a predetermined range is assigned to that tonal value, and the threshold values within the clustering screen are reduced by that numeric value to modulate the effect that the clustering screen has on the underlying error diffusion analysis thereby represents a departure from the algorithms of the prior art and provides greatly improved printed output.

It is therefore an object of the present invention to provide a novel algorithm for use in processing an image in preparation for printing. It is a further object of the present invention to provide a half-toning algorithm that utilizes both the clustering and error diffusion half-toning methods while modulating the clustering effect to provide smoother rendering as compared to the prior art. It is yet a further object of the present invention to provide a half-toning algorithm that can be applied in real time in a manner that reduces the processing time for a printed image. It is still a further object of the present invention to provide a half-toning algorithm that serves to modulate the clustering effect in a manner that increases clustering in deep tonal regions while reducing clustering in lighter tonal regions.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 2 is an enlarged view of the physical dots as rendered and printed utilizing an error diffusion half-tone printing method;

DETAILED DESCRIPTION OF THE INVENTION

As was stated above, the present invention is generally directed to a new algorithm for controlling the half-toning process when generating printed output. The algorithm is directed to utilizing a combination of both the prior art error diffusion and clustering screen methods. By modulating the application of each of these methods by limiting their use to tonal regions that highlight their relative strengths, a more consistent and pleasing output is achieved. In order to understand the algorithm of the present invention and the process by which both the error diffusion and clustering screen are modulated, the underlying prior art methods must first be described in detail.

In general, the algorithm of the present invention is equally applicable to any type printing operation and may be applied with equal efficacy to monochromatic (black and white), grayscale or color printing operations. Further the algorithm of the present invention may be incorporated into the control system for any type of printer that relies on a half toning process for generating printed output. Such printers may include, but are not limited to, thermal transfer printers, direct thermal printers, dye sublimation printers and laser printers for example. In addition, the algorithm of the present invention may be implemented on a computer device, which then transfers the processed image to a printer for generating the output based on commands sent from the computer. When analyzing images in preparation for printing, the standard in the prior art provides for each pixel in the image to be represented by three tonal values, wherein each of the tonal values represents the intensity of color from each of three color channels that must be combined to represent the actual color of the pixel. Further the predetermined range for the tonal value that is assigned to each of the color channels falls between 0 and 255, wherein 0 represents the greatest or darkest tonal value for any given channel and 255 represents the lowest or lightest tonal value. Accordingly, given the possibility of 256 tonal values in each of three different color channels, a spectrum of approximately 16.7 million colors can be represented. In the simplest example, a color having a tonal value of 0,0,0 in each of the three color channels would represent black while a color having a tonal value of 255, 255, 255 in each of the three color channels would represent white. For the purpose of illustration in the context of this application, the examples will assume a monochromatic image. It can be appreciated however that in the context of color images the entire process remains the same and is simply duplicated for each of the color channels being processed.

Figure 1:
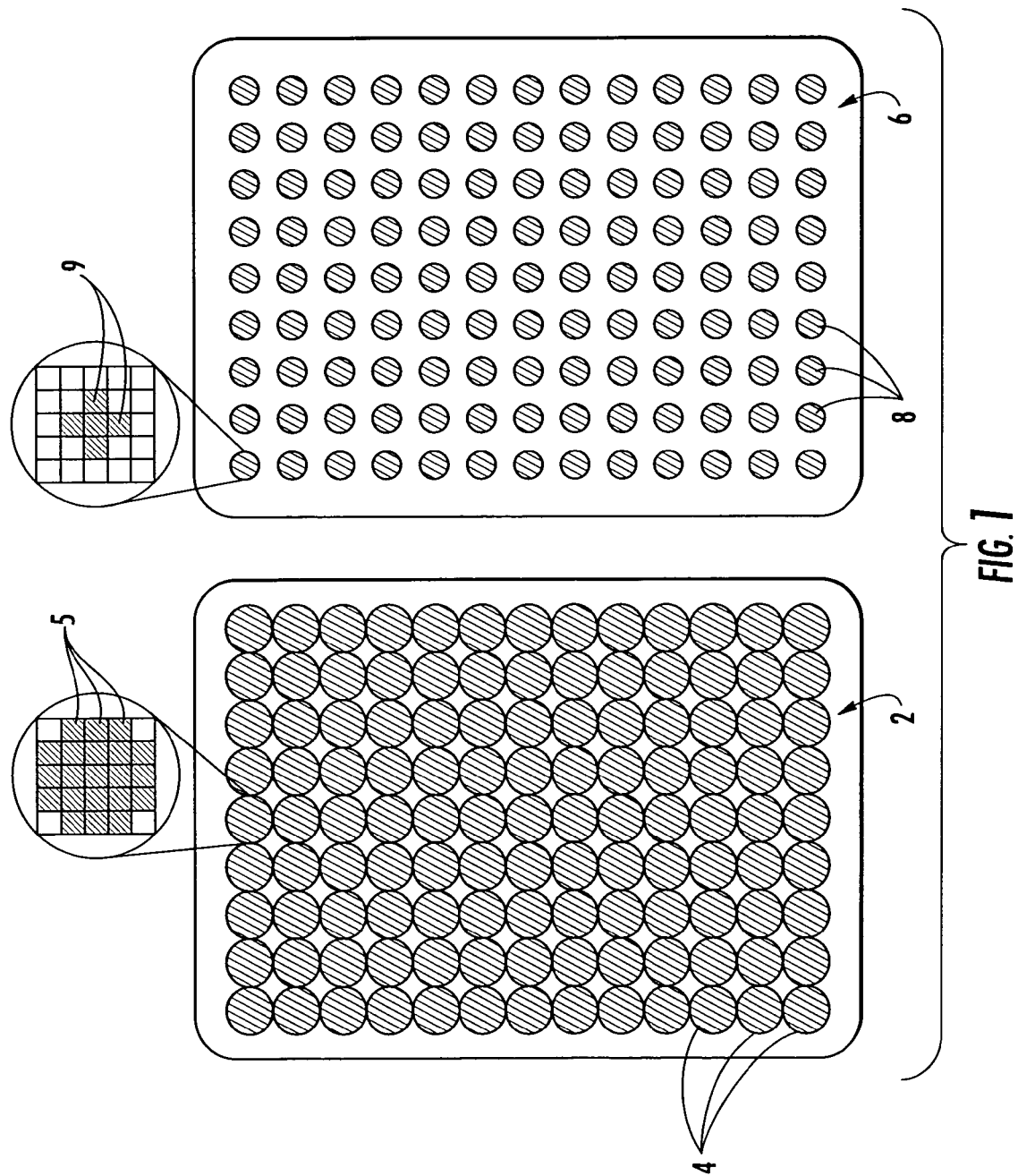
FIG. 1 is an enlarged view of the dots printed utilizing a clustering half-tone printing method.
Figure 3:
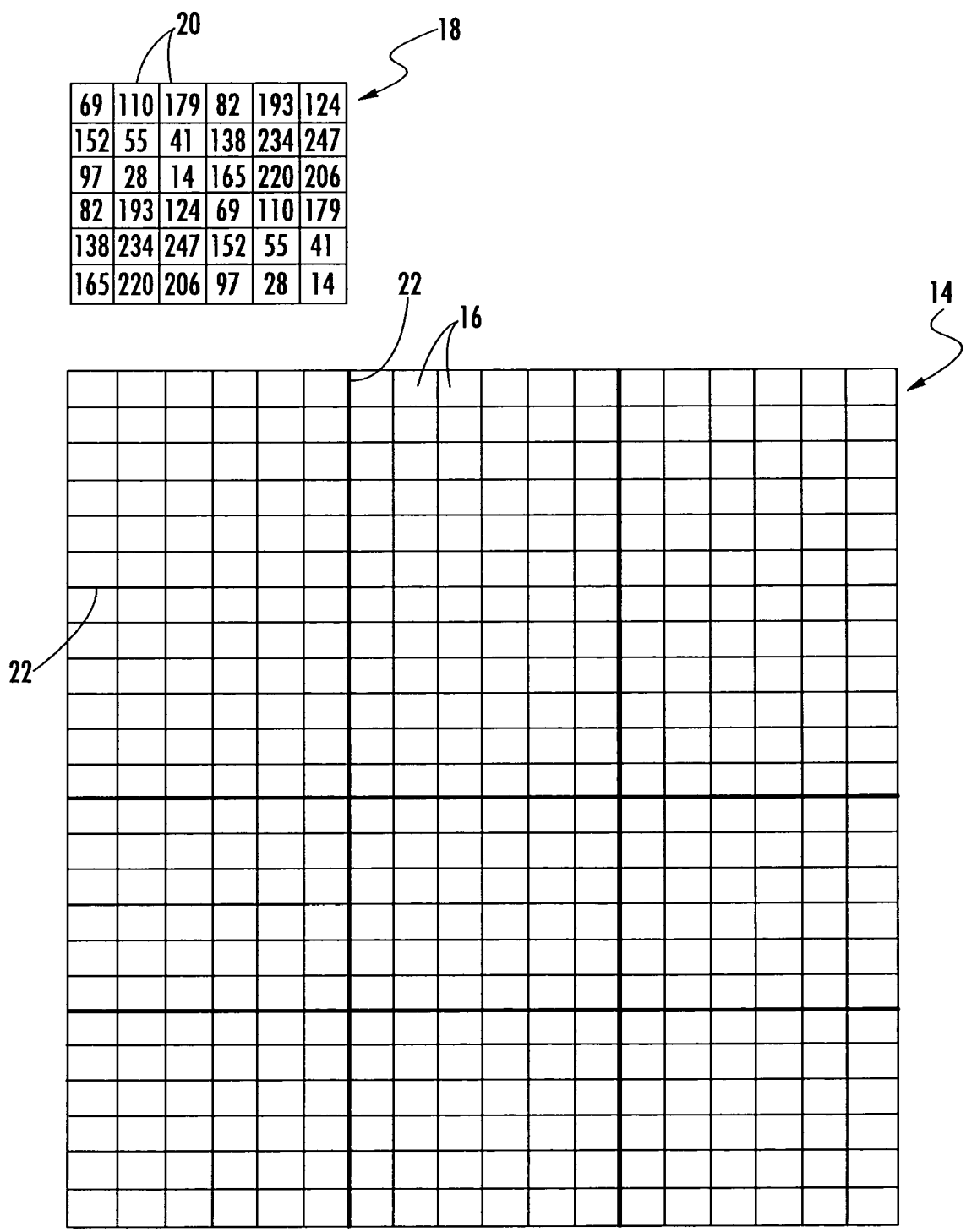
FIG. 3 is an illustration depicting an array of pixels to be analyzed and a clustering screen tile.

In the error diffusion method, each pixel of an image is analyzed and compared to a predetermined threshold value to decide whether to turn a physical printer dot on or off. Turning now to FIG. 3, a grid 14 is shown wherein each of the smaller boxes represents a single pixel 16 wherein the entire array of pixels 16 represents the overall image to be processed. As the error diffusion process is applied a pixel 16 is analyzed to determine its tonal value. That tonal value is compared to a preset error diffusion threshold value, which is typically set at 127. If the pixel 16 tonal value is lower than the error diffusion threshold, the physical dot is turned on. Conversely, if the pixel 16 tonal value is greater than the error diffusion threshold, the physical dot 16 is turned off. It can be seen that in making this determination, an error is generated that is represented by the actual difference between the error diffusion threshold value and the actual tonal value of the pixel 16. This difference in values is calculated and diffused over subsequent pixels 16 so that the error is either added to or subtracted from subsequent pixel 16 tonal values as they are analyzed, thereby serving to distribute and compensate for the generated error. In this process, high resolutions are possible, but the algorithm used to distribute the error tends to create a worming artifact in the resultant output and further, this process tends to reach a saturation level quickly, resulting from dot gain as the tonal values deepen.

In the clustering screen method, a tile 18 covering an array of pixels 16 is created. The tile 18 utilizes a different threshold value 20 for each pixel 16 within the array 14. The thresholds 20 are arranged in a pattern that tends to create localized clusters of "on" pixels 16 as the tonal values of the pixels 16 represented deepen. In FIG. 3, a representative 6×6 clustering screen tile 18 is shown. The clustering screen 18 includes representative threshold values 20 based on a "medium" screen. It should be appreciated that these threshold values 20 are provided by way of example and are not intended to represent every possible combination of threshold provided within the clustering screen method. Further, these threshold samples are provided for illustration only and are not meant to limit the present disclosure in any manner.

In application, the clustering screen 18 is applied to the image being analyzed by tiling the screen 18 over the array of pixels 14 representing the entire image. The bold lines 22 illustrate the locations where the clustering screen tiles 18 are applied to the image for the purpose of analyzing the underlying pixels 16. The tonal value of each pixel 16 within the image is compared to the threshold value 20 within the cell of the clustering screen 18 that overlies that pixel's 16 position. If the tonal value of the pixel 16 is less than the corresponding threshold value 20 in the clustering screen 18 the physical dot 16 is turned on. If the tonal value of the pixel 16 is less than the corresponding threshold value 20 in the clustering screen 18, the physical dot 16 remains off. The tile 18 is then applied to the adjacent array of pixels 16 and the process is repeated until the entire image is processed. The clustering method works well in deep tonal regions by reducing the effect of saturation resulting from dot gain. The drawbacks associated with clustering are a reduction in resolution in lighter tonal regions and a limited number of possible tonal representations that can be achieved within a limited screen size thereby causing a stair stepping effect when reproducing gradients.

The algorithm of the present invention provides a method for analyzing the pixels 16 within an image using a combination of both the error diffusion method and the clustering screen wherein the effects of the clustering screen are modulated in a manner that limits clustering in lighter tonal regions while maximizing clustering in the lighter tonal regions.

Figure 4:
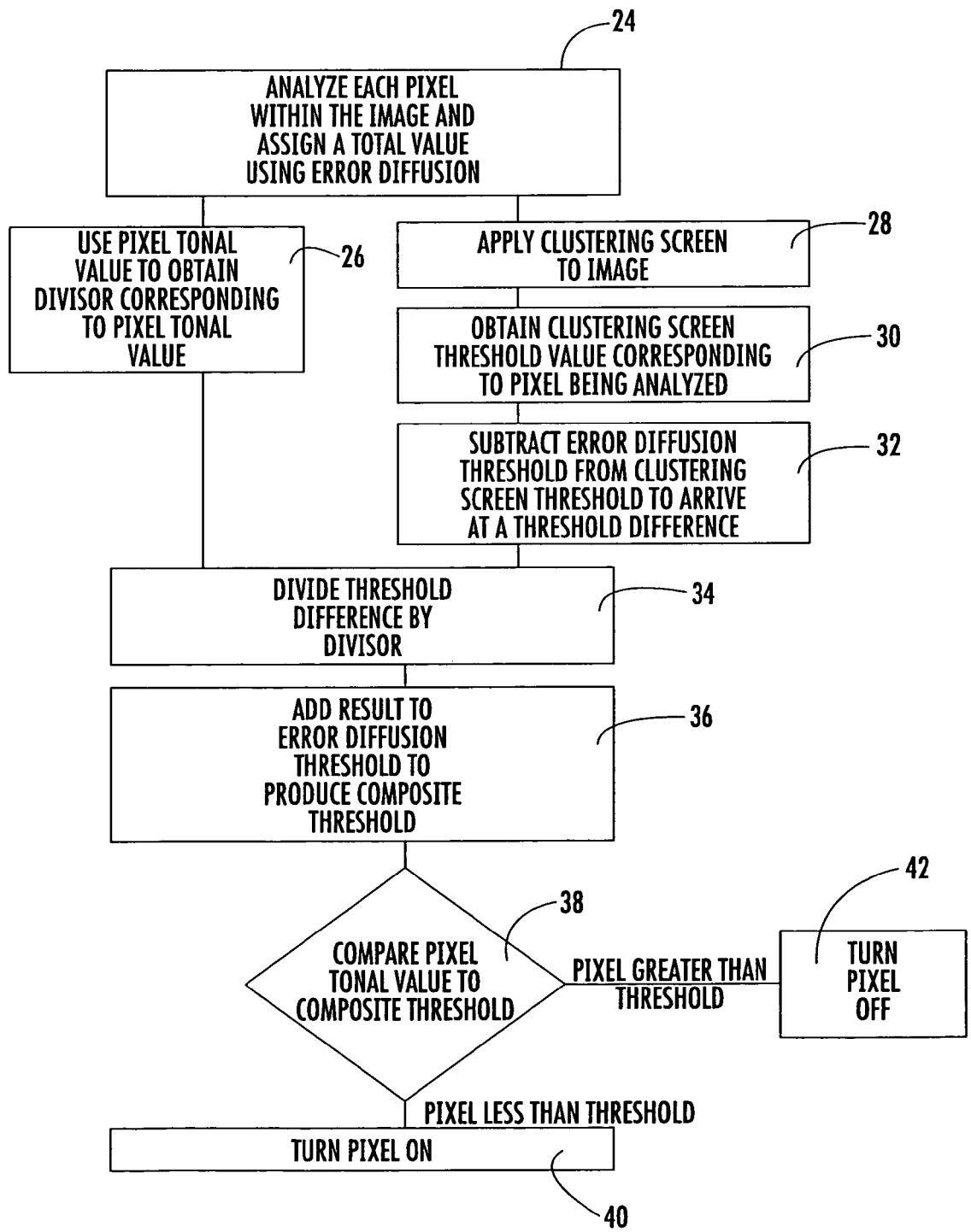
FIG. 4 is a flow chart depicting the operation of the algorithm of the present invention.

Turning to FIG. 4, the algorithm of the present invention is described in detail. Initially, as the algorithm of the present invention is employed to analyze an image, the algorithm utilizes an error diffusion process to assign a tonal value to each individual pixel 24. It can be appreciated that in applying the error diffusion method the tonal value for each pixel will be an error diffusion modified tonal value and not an absolute tonal value. The tonal value that corresponds to each pixel is utilized to obtain a divisor value 26. This divisor value is particularly important in the context of the present invention in that it is the divisor value that serves to modulate the application of the clustering effect as will be described in detail below.

Once the tonal value of each pixel is determined 24, a clustering screen is tiled over the image 28 to obtain a clustering screen threshold for each of the pixels being analyzed 30. The algorithm then performs a calculation for each pixel under the clustering screen wherein the error diffusion threshold is subtracted from the clustering screen threshold that corresponds to each of the pixels, thereby computing a threshold difference for each of the pixels 32. The threshold difference is then reduced (divided) by the divisor value 34 and that result is added to the error diffusion threshold to produce a composite threshold 36. Finally, the composite threshold is compared to the pixel tonal value 38. If the pixel tonal value is less than the composite threshold, the physical dot is turned on 40. If the pixel tonal value is greater than the composite threshold, the physical dot remains off 42. The process is then repeated until all of the pixels in the image have been analyzed.

The key element of the algorithm that provides the unique modulation of the clustering effect is the use of the divisor. The divisor value is a numeric real number constant between 1 and 6 that corresponds to the intensity of the tonal value of the pixel being analyzed. The deeper the tonal value of the pixel being analyzed, the closer the divisor value is to 1. Similarly, the lighter the tonal value of the pixel is, the closer the divisor is to 6. Further, the divisor value is a constant that is determined based on a linear scale ranging between 1 and 6. For example, a pixel tonal value of 20 provides a divisor constant of 1.39 and a pixel tonal value of 140 provides a divisor constant of 3.74. In terms of the overall effect of the divisor on the algorithm, when the pixel tonal value is deeper, the divisor is closer to 1 and the impact on the threshold from dividing by the smaller number is very low. Therefore, the clustering screen is applied to create a stronger clustering effect. In contrast, when the pixel tonal value is lighter, the divisor is closer to 6 and the impact on the threshold is much greater thereby greatly reducing the effect of the application of the clustering screen and producing a weaker clustering effect.

EXAMPLE 1

Image pixel tonal value=20
Clustering screen threshold value=69
Error diffusion threshold=127

1) Pixel is analyzed using error diffusion. The error diffusion difference between 20 and 127 is distributed to neighboring pixels using the error diffusion rules.
2) Error diffusion threshold (127) is subtracted from clustering threshold (69) to produce threshold difference: 69−127=−58
3) Obtain divisor based on pixel tonal value (20). Divisor=1.39
4) Divide threshold difference (−58) by divisor (1.39): −58/1.39=−41.73
5) Add result (−41.73) to error diffusion threshold (127) to produce composite threshold: 127+−41.73=85.27
6) Pixel tonal value (20) is compared to composite threshold (85). Pixel tonal value is lower so the corresponding physical dot is turned ON

EXAMPLE 2

Image pixel tonal value=140
Clustering screen threshold value=110
Error diffusion threshold=127

1) Pixel is analyzed using error diffusion. The error diffusion difference between 140 and 127 is distributed to neighboring pixels using the error diffusion rules.
2) Error diffusion threshold (127) is subtracted from clustering threshold (110) to produce threshold difference: 110−127=−17
3) Obtain divisor based on pixel tonal value (140). Divisor=3.74
4) Divide threshold difference (−17) by divisor (3.74): −17/3.74=−4.55
5) Add result (−4.55) to error diffusion threshold (127) to produce composite threshold: 127+−4.55=122.45
6) Pixel tonal value (140) is compared to composite threshold (122). Pixel tonal value is higher so the corresponding physical dot is turned OFF The process of the present invention, wherein the pixels within each region being processed is evaluated to assign a tonal value to the region, a numeric value within a predetermined range is assigned to that tonal value and the threshold values within the clustering screen are reduced by that numeric value to modulate the effect that the clustering screen has on the underlying error diffusion analysis represents a departure from the algorithms of the prior art and provides greatly improved printed output. As stronger clustering is needed to correctly print deep tonal values without saturation and worming effects, the clustering screen is allowed its full effect. Similarly as higher resolution is needed in lighter tonal regions, the clustering effect is greatly reduced to allow the error diffusion process to have full effect. Further the application of the algorithm of the present invention provides for a smooth transition between use of the clustering screen and the error diffusion process thereby eliminating the stair stepping effect that was typically manifest in prior art algorithms.

It can therefore be seen that the present invention provides a novel algorithm for controlling the half toning process wherein a clustering screen is overlaid with an error diffusion process in a modulated fashion to control the relative strength of the clustering effect based on the tonal value of the pixel being analyzed. Further, the present invention provides for an algorithm that applies a clustering screen to an error diffusion analysis in a modulated fashion in real time that provides for greatly enhanced printed output. For these reasons, the present invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method for analyzing an image, said image formed by an array of pixels and generating half tone output, said method comprising:

performing an error diffusion analysis by applying an error diffusion threshold to said array of pixels within said image to determine a tonal value for each pixel and distributing any differences between said tonal value and said threshold to adjacent pixels within said array of pixels;

determining a divisor constant for each pixel based on said tonal value for each pixel;

tiling a clustering screen over said plurality of pixels, said clustering screen including an array of clustering thresholds; and modulating the application of said clustering screen by reducing the threshold values within said clustering screen by said divisor constant to generate half tone output, wherein the effects of said clustering screen are increased for deeper tonal values and the effects of said clustering screen are decreased for lighter tonal values;

and wherein said method is performed by a controller in a printing device or on a computer processor.

2. The method of claim 1, wherein said divisor constant is a real number between 1.0 and 6.0.

3. The method of claim 1, wherein said divisor constant is a real number constant that is determined based on a linear relationship between said pixel tonal value and said real number constant.

4. The method of claim 1, wherein said method is applied to the image once for each color channel being processed.

5. The method of claim 1, wherein said step of modulating said clustering screen further comprises the steps of:
   subtracting said error diffusion threshold from said clustering threshold to generate a threshold difference;
   dividing said threshold difference by said divisor to generate a reduced threshold difference;
   adding said reduced threshold difference to said error diffusion threshold to generate a composite threshold; and
   comparing said pixel tonal value to said composite threshold,
   wherein said physical printer dot is turned on if said pixel tonal value is less than said composite threshold and said physical printer dot is turned off if said pixel tonal value is greater than said composite threshold.

6. The method of claim 5, wherein said method is applied to the image once for each color channel being processed.

7. The method of claim 1, wherein said method is performed by a controller in a printing device.

8. The method of claim 1, wherein said method is performed on a computer processor and said halftone output is transmitted to a printing device.

9. A method for analyzing an image, said image formed by an array of pixels and generating half tone output, said method comprising:
   performing an error diffusion analysis by applying an error diffusion threshold to said array of pixels within said image to determine a tonal value for each pixel and distributing any differences between said tonal value and said threshold to adjacent pixels within said array of pixels;
   determining a divisor constant for each pixel based on said tonal value for each pixel;
   subtracting said error diffusion threshold from an array of clustering thresholds within a clustering screen to generate a modified clustering screen containing an array of threshold differences;
   tiling said modified clustering screen over said array of pixels;
   dividing said threshold differences by said divisor corresponding to said underlying pixel to generate a reduced threshold difference;
   adding said reduced threshold difference to said error diffusion threshold to generate a composite threshold; and
   comparing said pixel tonal value to said composite threshold,
   wherein said physical printer dot is turned on if said pixel tonal value is less than said composite threshold and said physical printer dot is turned off if said pixel tonal value is greater than said composite threshold.

10. The method of claim 9, wherein said divisor constant is a real number between 1.0 and 6.0.

11. The method of claim 9, wherein said divisor constant is a real number constant that is determined based on a linear relationship between said pixel tonal value and said real number constant.

12. The method of claim 9, wherein said method is applied to the image once for each color channel being processed.

13. The method of claim 9, wherein said method is performed by a controller in a printing device.

14. The method of claim 9, wherein said method is performed on a computer processor and said halftone output is transmitted to a printing device.

* * * * *